Figure 2:
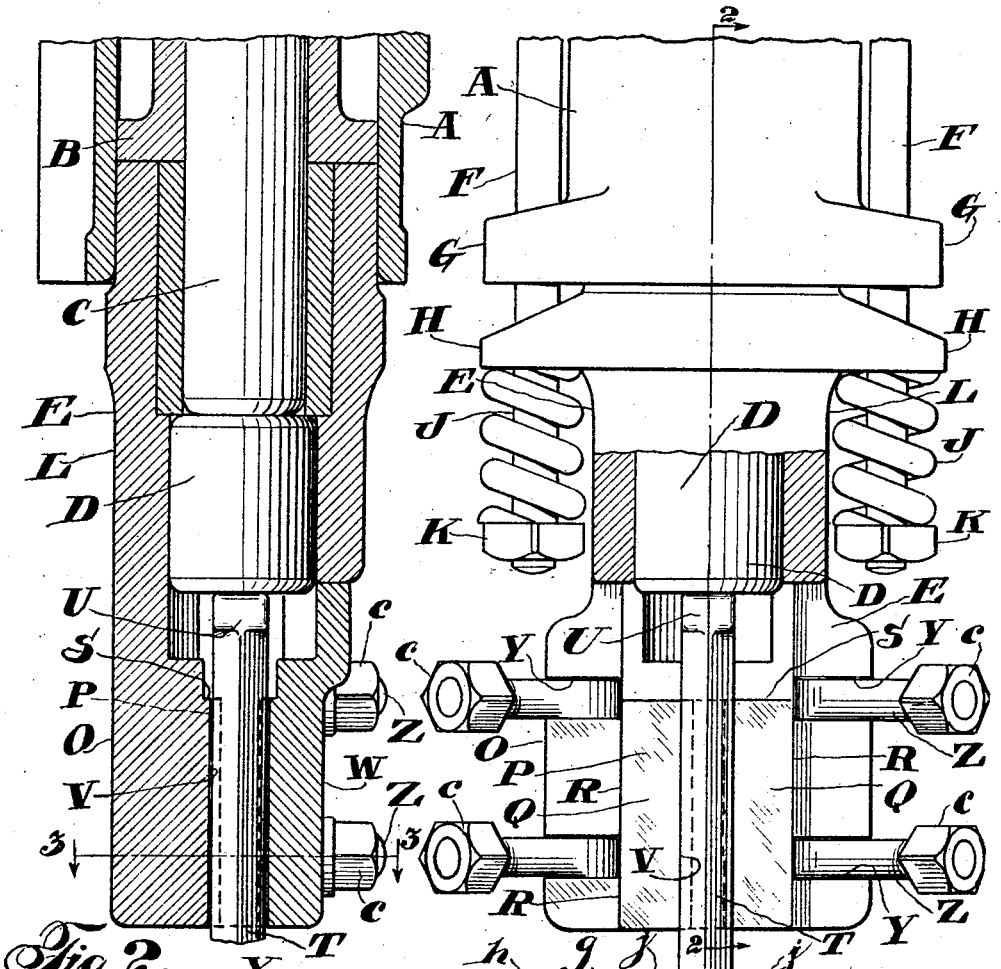

May 10, 1927. 1,627,737
C. C. HANSEN
BROACHING ATTACHMENT
Filed May 14, 1926 2 Sheets-Sheet 1

INVENTOR
Charles C. Hansen
BY
HIS ATTORNEY.

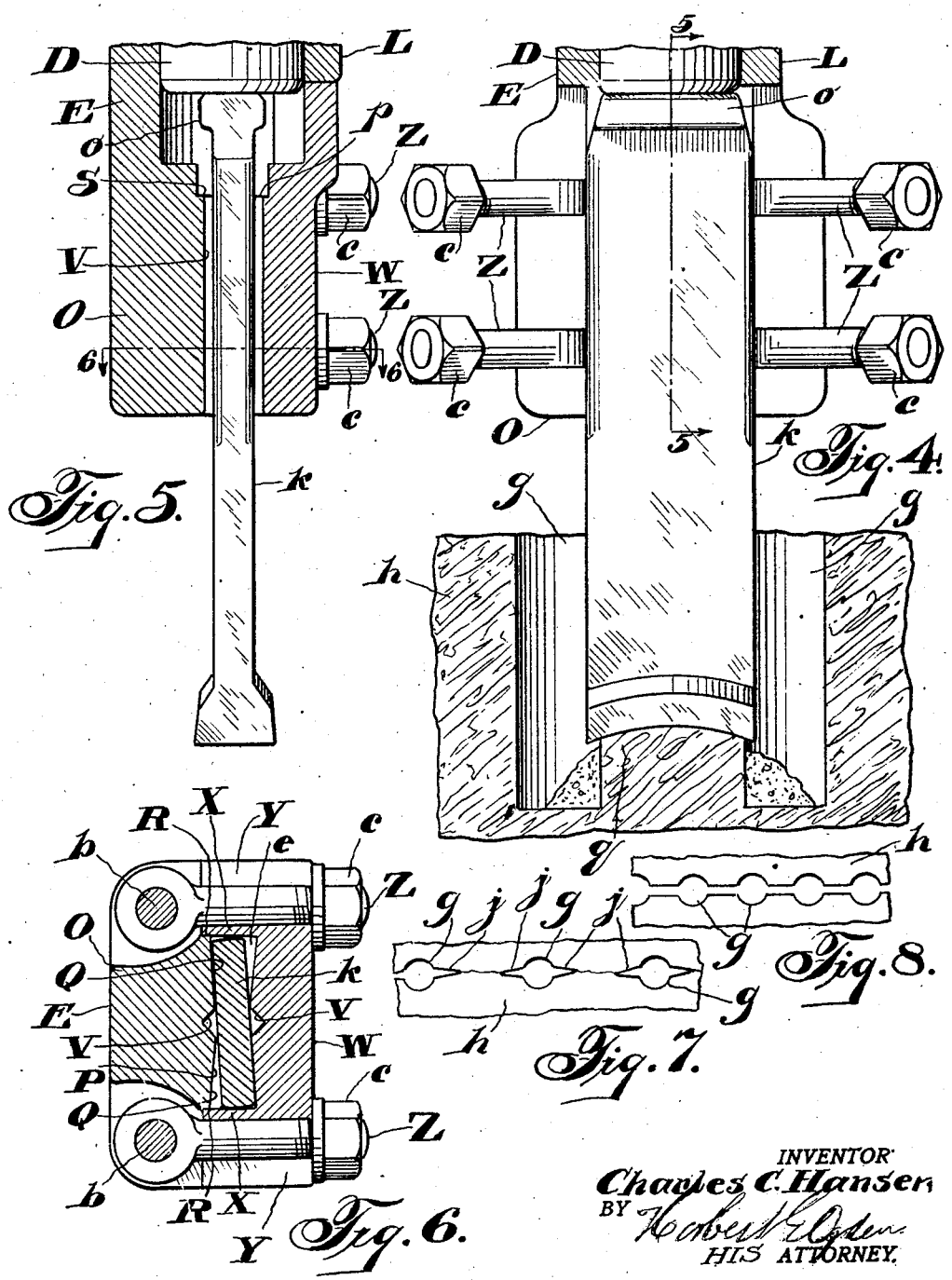

Patented May 10, 1927.

1,627,737

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

BROACHING ATTACHMENT.

Application filed May 14, 1926. Serial No. 109,032.

This invention relates to rock drills, but more particularly to a broaching and reaming attachment for fluid actuated rock drills of the hammer type.

In quarrying operations for which the present invention is contemplated, various methods are employed for severing symmetrical blocks of rock from the mass. One method of accomplishing this is to drill a series of holes in line, leaving narrow walls of rock between the drill holes. After the holes have been drilled, the walls thus formed are cut away by means of a broaching tool. In this way the rock may be cut at a considerable saving of time and material over other well known methods.

Another method frequently employed in operations of this kind, depending, of course, upon the type of material being quarried, is to run a reaming tool through the drill holes to cut triangular notches on opposite sides of the holes, such notches extending generally in the direction of the line of severance. A light charge of explosive material is then exploded in the drill holes and the block is thus broken from the bed along the desired line without injury to the material. This method is preferred by some over the former method, for the reason that a smaller amount of drilling is required. This is due to the fact that the holes may be spaced a greater distance apart from each other and the spacing thereof is not limited by the distance which may be practicably spanned by a broaching tool.

Heretofore, it has been customary to use a common rock drill front head and chuck parts for the reception and guidance of both the drill steel and the broaching tool. This practice, however, limits the cross section of the broaching tool shank to the size of the drill steel shank. This is objectionable for the reason that the broaching tool will then not be sufficiently rigid to prevent the departure of the cutting bit from the desired course. The present invention aims to overcome this objectionable feature and permits the use of a broaching tool of substantially uniform cross-section and rigidity throughout its length.

Other objects of the invention are to enable either a broaching tool or a reaming tool to be suitably supported by a common attachment, and to permit limited oscillatory movement of the broaching tool about its longitudinal axis so that the tool may readily adjust its position with respect to the drill holes.

Further objects will be in part obvious and in part pointed out hereinafter.

The invention consists of the combinations of elements and features of construction substantially as hereinafter described and more particularly pointed out in the appended claims and illustrated in the accompanying drawings, in which—

Figures 1, 3:
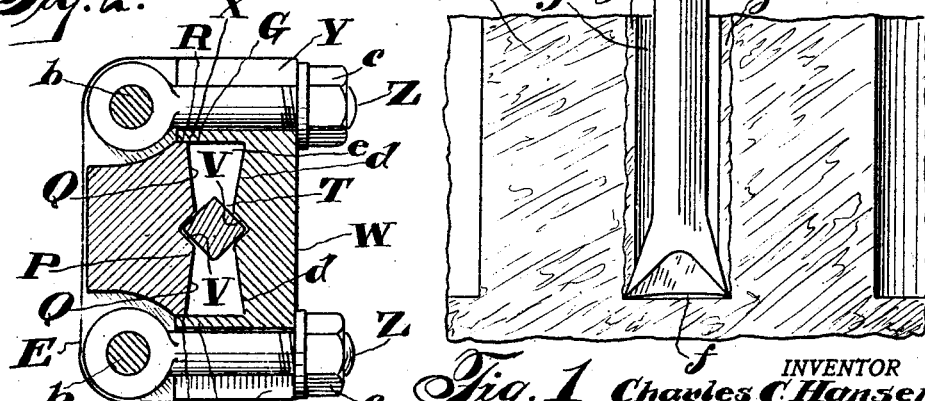

Figure 1 is an elevation of the front end of a rock drill provided with an attachment constructed in accordance with the present invention, showing the manner in which a reaming tool may be supported by the attachment, Figure 2 is a sectional elevation taken through Figure 1 on the line 2—2 looking in the direction of the arrows, Figure 3 is a transverse view taken through Figure 2 on the line 3—3 looking in the direction of the arrows, Figure 4 is a view similar to Figure 1 illustrating the manner in which a broaching tool may be guided by the attachment, Figure 5 is a sectional elevation taken through Figure 4 on the line 5—5 looking in the direction of the arrows, Figure 6 is a transverse view taken through Figure 5 on the line 6—6 looking in the direction of the arrows, Figure 7 is a plan view of a rock face intended to illustrate the spacing of the drill holes and the manner in which the holes are notched by the reaming tool illustrated in Figures 1 to 3 inclusive, and Figure 8 is a view similar to Figure 7 illustrating the spacing of the holes when the material is severed by a broaching tool.

Referring to the drawings, the invention is shown embodied in a rock drill having a cylinder A, only the front end of which is shown. Within the cylinder A is a bushing B which acts as a guide for a hammer piston C adapted to reciprocate therein to deliver blows to an anvil block D.

In accordance with the present invention, an attachment or front head E is supported by the cylinder A and is secured thereto in the present instance by means of side bolts F which extend through lugs G and H formed on the cylinder A and the front head E respectively. The bolts F are preferably provided with springs J which serve to hold the front head E yieldably within the cylinder A. Nuts K are screwed on the ends of the bolts F to provide a seat for one end of the springs J and also serve as a means for adjusting the tension of said springs.

The rearward portion L of the front head E in this instance is of generally cylindrical formation and is formed integrally with a forward extension O, preferably of generally rectangular form. The inner side of the extension O is provided with a cheek plate P which has laterally diverging sides Q terminating in this instance at their outer ends in shoulders R. The innermost or rearward end of the cheek plate P is preferably somewhat shorter than the extension O to form a shoulder S which serves as a stop for a reaming tool T having a head U at its rearward end adapted to impact or rest on the shoulder S. The cheek plate P is illustrated in the drawing as being formed integrally with the extension O, however, it is to be understood that the cheek plate may be formed as a separate member, if desired, and secured to the extension O in any suitable manner. At the point of divergence of the sides Q is formed a groove V preferably of triangular form to receive a corner of the rectangular tool T.

Suitable and convenient means are provided for securing the tool T in operative position in the attachment O. To that end a guide block W having lateral end walls X to abut the extension O is provided for the front head. The lateral sides X are spaced to cooperate with the shoulders R of the cheek plate P for holding the guide block W against transverse movement with respect to the extension O. In the present instance the guide block W is provided with suitable slots Y formed in the lateral walls X for the reception of eye-bolts Z pivoted in the extension O as at $b$ and carrying at their threaded ends nuts $c$ which may be screwed against the outer face of the guide block W for clamping said guide block securely in position. The guide block W, like the cheek plate P, is also provided with a triangular groove V to cooperate with the groove V in the cheek plate for guiding the tool T.

In common with the cheek plate P, the guide block W is also provided with diverging faces $d$, thus forming a guideway $e$ having flared sides for a purpose to be more fully described hereinafter.

From the foregoing description, it will be observed that the reaming tool T will be adequately held against rotative movement in the attachment so that the cutting point $f$ of the tool T may be readily held centrally within a drill hole $g$ in the rock $h$, and the cutting edge may also be held on the desired line to form the notches $j$ in the sides of the drill hole $g$.

To insert the broaching tool T in the attachment, the nuts $c$ may be unscrewed a sufficient distance on the bolts D to permit the bolts to be swung outwardly free of the slots Y. The guide block W may then be removed and the reaming tool may be placed in the attachment so that one of the corners of the tool may cooperate with the groove V in the cheek plate P. Thereafter the guide block W may be placed in position and the bolts Z rocked into the slots Y and the nuts $c$ may be screwed down firmly against the side of the guide block W. The tool will thus be held securely in position to receive the blows of the hammer piston, transmitted in this instance by the anvil block D.

In Figures 4 to 6 inclusive is illustrated the manner in which a flat rectangular broaching tool $k$ may be guided in the guideway $e$. The broaching tool here illustrated is substantially like that described in my copending application Serial No. 80,017 entitled Broaching tool, filed January 8, 1926. The tool $k$ accordingly has a head $o$ which may cooperate with the shoulders S on the cheek plate P and a similar shoulder $p$ formed on the guide block W for preventing ejection of the tool $k$ from the attachment. It will be noted in these figures, and more particularly in Figure 6, that the intermediate portion of the guideway $e$ is only of sufficient width to prevent tilting of the tool. It is this portion which prevents the tool from inclining from the longitudinal axis of the attachment. Owing to the fact that the sides of the guideway $e$ are flared, the broaching tool $k$ is, however, permitted to oscillate somewhat about its longitudinal axis. Such oscillatory movement of the tool is permitted for the purpose of allowing the tool to adjust its position with respect to the drill holes $g$ adjacent the wall $q$ of the rock upon which the broaching tool may be operating. This is a desirable feature in devices of this character since it so happens at times that in drilling the holes, the drill steel may encounter a seam or crevice and may be deflected somewhat from the desired line of cut. It is obvious therefore, that whenever a broaching tool is so rigidly guided as to prevent a slight degree of adjustment, said tool, in following a perfectly straight line, may depart from the wall between the drill holes and thus merely cut a slot in the rock without actually forming a passageway between the drill holes.

I claim:

1. A broaching attachment for a rock drill, comprising a front head adapted to be secured to the rock drill, an extension on the front head having laterally diverging surfaces, a guide block having laterally diverging surfaces to cooperate with the surfaces on the extension to form a guideway with flared sides for guiding a flat rectangular tool and to permit such tool to oscillate about its longitudinal axis, and means for clamping the guide block to the extension.

2. A broaching attachment for a rock drill, comprising a front head adapted to be secured to the rock drill, an extension on the front head having laterally diverging surfaces to cooperate with the surfaces on the extension to form a guideway with flared sides for guiding a broaching tool and to permit such broaching tool to oscillate about its longitudinal axis, grooves in the diverging surfaces for the reception and guidance of a reaming tool, and means for clamping the guide block to the extension.

3. A broaching attachment for a rock drill, comprising a front head adapted to be secured to the rock drill, an extension on the front head having laterally diverging surfaces, a recessed guide block removably secured to the extension, said guide block having laterally diverging surfaces cooperating with the surfaces on the extension to form a guideway with flared sides for guiding a broaching tool and to permit such tool to rock about its longitudinal axis, rectangular grooves at the apex of the diverging surfaces for the reception and guidance of a reaming tool, shoulders at the inner ends of the diverging sides to prevent ejection of the tools from the attachment, and means for securing the guide block to the front head.

In testimony whereof I have signed this specification.

CHARLES C. HANSEN.